United States Patent
Allpress et al.

(10) Patent No.: US 9,083,446 B2
(45) Date of Patent: Jul. 14, 2015

(54) METHOD AND SYSTEM FOR PROCESSING A SIGNAL

(75) Inventors: Steve Allpress, Bristol (GB); Steve Felix, Bristol (GB); Abdelkader Medles, Bristol (GB)

(73) Assignee: ICERA INC., Wilmington, DE (US)

( * ) Notice: Subject to any disclaimer, the term of this patent is extended or adjusted under 35 U.S.C. 154(b) by 1030 days.

(21) Appl. No.: 12/889,035

(22) Filed: Sep. 23, 2010

(65) Prior Publication Data

US 2011/0075773 A1    Mar. 31, 2011

(30) Foreign Application Priority Data

Sep. 25, 2009  (GB) .................................. 0916913.7

(51) Int. Cl.
*H04B 1/00* (2006.01)
*H04B 1/7117* (2011.01)
*H04L 7/00* (2006.01)

(52) U.S. Cl.
CPC .............. *H04B 1/7117* (2013.01); *H04L 7/007* (2013.01); *H04L 7/0029* (2013.01)

(58) Field of Classification Search
USPC ......................... 375/130–153, 219, 220, 222, 375/240.26–240.29, 259–260, 267, 316, 375/324, 340, 346, 350, 229–236, 262, 285, 375/284, 348, 349, 3, 25, 326, 338
See application file for complete search history.

(56) References Cited

U.S. PATENT DOCUMENTS

| | | | |
|---|---|---|---|
| 8,027,373 B2 * | 9/2011 | Subrahmanya et al. ....... | 375/149 |
| 2003/0026326 A1 * | 2/2003 | Jayaraman et al. ........... | 375/148 |
| 2003/0152167 A1 * | 8/2003 | Oh et al. ........................ | 375/326 |
| 2003/0186714 A1 * | 10/2003 | Vihriala ......................... | 455/506 |
| 2006/0222130 A1 * | 10/2006 | Dominique et al. ........... | 375/355 |
| 2006/0258294 A1 * | 11/2006 | Juncker et al. .............. | 455/67.11 |
| 2008/0112511 A1 * | 5/2008 | Paul et al. ..................... | 375/340 |
| 2008/0267260 A1 | 10/2008 | Bertrand et al. | |
| 2008/0310485 A1 | 12/2008 | Soliman et al. | |
| 2009/0111461 A1 * | 4/2009 | Luschi et al. ................. | 455/423 |
| 2009/0190642 A1 | 7/2009 | Brueninghaus et al. | |

FOREIGN PATENT DOCUMENTS

EP    2204915 A1    7/2010

* cited by examiner

Primary Examiner — Linda Wong

(57) ABSTRACT

Method and receiver for processing a signal in a wireless communication system in which the signal comprises a sequence of chips. The signal is receive data at least one rake finger and sampled. There is a time spacing $t_1$ between successive samples less than the time spacing $t_c$ between successive chips in the signal. Channel conditions on the channel are estimated and based on estimated channel conditions by the following steps: monitoring timing of the signal on one of the at least one rake finger to determine a time difference between the timing of the signal on the one of the at least one rake finger and the timing of the generation of the samples, the determined time difference being a multiple of $t_2$, where $t_2 < t_1$; aligning the timing of the generation of the samples with the timing of the signal on the one of the at least one rake finger to within a timing range $t_2$.

9 Claims, 7 Drawing Sheets

METHOD AND SYSTEM FOR PROCESSING A SIGNAL

CROSS REFERENCE TO RELATED APPLICATION

This application claims the benefit of Great Britain Application No. GB 0916913.7 filed on Sep. 25, 2009, entitled "A METHOD AND SYSTEM FOR PROCESSING A SIGNAL." The above application is commonly assigned with the present application and is incorporated herein by reference in its entirety.

TECHNICAL FIELD

This invention relates to a method and system for processing a signal, in particular in a wireless communication system.

BACKGROUND

In wireless communication systems, such as a 3GPP Wide Band Code Division Multiple Access (WCDMA) system (3GPP TS 25.211, "Technical Specification Group Radio Access Network; Physical Channels and Mapping of Transport Channels onto Physical Channels (FDD)", December 2005) a rake receiver is used to receive signals transmitted over a wireless channel. A rake receiver typically performs maximum ratio combining of the received signal by combining the received signals of different paths on the channel proportionally to the strength of each path. The rake receiver assumes that the channel has a limited number of paths and assigns a rake finger to each of the paths. Each rake finger implements the operation of descrambling and/or despreading the received signal where the timing at which the sequence of the signal is taken corresponds to the channel path delay to which the rake finger is assigned. The signal output from the rake receiver can be passed to a decoder for decoding the signal.

The signal is typically sampled at a sampling rate 1/T, where T is the time spacing between samples. The sampling rate is generally chosen to be small in order to save power and memory usage in the receiver. However, according to the Nyquist theorem, the signal should be sampled at a sampling rate which is at least two times the bandwidth of the signal in order for recovery of all of the data in the signal to be possible. This means that a signal is typically sampled at a rate of approximately two times the bandwidth of the signal. The sampled signal is typically passed to an interpolation filter which samples the signal with a sampling rate of $$\frac{N_I}{T},$$

where $N_I$ is an oversampling factor used by the interpolation filter.

With reference to FIG. 1a there is shown the timing of the signal samples which are input to the interpolation filter 106 having a time spacing between the samples of T. The timing of the samples taken by the interpolation filter is generally not perfectly aligned with the timing of the incoming signals. FIG. 1b shows the timing of the samples which are output from the interpolation filter having a time spacing between the samples of $$\frac{T}{N_I}.$$

The interpolation filter can only correct for timing errors of more than $$\pm\frac{T}{2N_I}.$$

This means that, due to the finite sampling rate of the interpolation filter, timing errors of less than $$\pm\frac{T}{2N_I}$$

are not corrected by the interpolation filter.

Increasing the oversampling factor of the interpolation filter allows the interpolation filter to correct smaller timing errors. Therefore the precision at which the path delays can be matched improves as the oversampling factor is increased. The value of the path delay can be matched by the interpolation filter with a precision of $$\pm\frac{T}{2N_I},$$

as would be apparent to one skilled in the art. It is therefore advantageous in terms of correcting for smaller timing errors to increase the oversampling factor used in the interpolation filter. However, increasing the oversampling factor used in the interpolation filter increases the complexity of the system. Increasing the complexity of the system can be problematic in that the performance of the system can be adversely affected.

SUMMARY

In a first aspect of the present invention there is provided an embodiment of a method of processing a signal in a wireless communication system, the signal comprising a sequence of chips, the method comprising: receiving the signal at least one rake finger; sampling the received signal to generate samples of the signal, wherein there is a time spacing $t_1$ between successive samples which is less than the time spacing $t_c$ between successive chips in the signal; estimating channel conditions on the channel; and based on the estimated channel conditions, selectively performing the steps of: monitoring the timing of the signal on one of the at least one rake finger to determine a time difference between the timing of the signal on the one of the at least one rake finger and the timing of the generation of the samples, the determined time difference being a multiple of $t_2$, where $t_2$ is less than $t_1$; and using the determined time difference to align the timing of the generation of the samples with the timing of the signal on the one of the at least one rake finger to within a timing range $t_2$.

In a second aspect of the present invention there is provided an embodiment of a system for processing a signal in a wireless communication system, the signal comprising a sequence of chips, the system comprising: at least one rake finger for receiving the signal; means for sampling the received signal to generate samples of the signal, there being a time spacing $t_1$ between successive samples which is less than the time spacing $t_c$ between successive chips in the signal; means for monitoring the timing of the signal on one of the at least one rake finger to determine a time difference between the timing of the signal on said one of the at least one rake finger and the timing of the generation of the samples, the determined time difference being a multiple of $t_2$, where $t_2$ is less than $t_1$; means for using the determined time difference to align the timing of the generation of the samples with the timing of the signal on the one of the at least one rake finger to within a timing range $t_2$; means for estimating channel conditions on the channel; and means for determining, based on the estimated channel conditions, whether the timing of the generation of the samples is to be aligned with the timing of the signal on said one of the at least one rake finger to within a timing range $t_2$.

In a third aspect of the present invention there is provided an embodiment of a method of processing a signal in a wireless communication system, the signal comprising a sequence of chips, the method comprising: receiving the signal at a rake finger; sampling the received signal to generate samples of the signal, wherein there is a time spacing $t_1$ between successive samples which is less than the time spacing $t_c$ between successive chips in the signal; estimating channel conditions on the channel; and based on the estimated channel conditions, adaptively switching in fine resolution timing correction method steps comprising: monitoring the timing of the signal on the rake finger to determine the timing of the signal on the rake finger to an accuracy of $$\pm \frac{t_2}{2},$$

where $t_2$ is less than $t_1$; and aligning the timing of the generation of the samples with the timing of the signal on the rake finger to within a timing range $t_2$.

The introduction of higher order modulation in order to achieve a high throughput rate puts severe constraints on receiver performance. In particular, the inventors have realized that for the 3GPP WCDMA system, in its Release 7 where QAM and MIMO modes have been introduced, achieving high precision timing resolution becomes particularly crucial to attain the highest performance. The inventors have implemented a new approach that achieves arbitrarily high time precision without increasing complexity or having any impact on existing receiver structures.

In some embodiments, a timing precision is achieved on the strongest rake finger corresponding to a grid with a fine timing resolution of $$\frac{T}{N_I N_P},$$

where $N_p$ is a phase coefficient of the interpolation filter described in more detail below and takes a value greater than 1. In this way the timing of the strongest finger is found with a finer resolution than that provided by the interpolation filter alone (which can provide a timing resolution of $$\frac{T}{N_I})$$

Finger time tracking is used to decide where to place the strongest finger on a grid with time spacing $$\frac{T}{N_I N_P}.$$

Then the allocation of the remaining fingers is decided with respect to the strongest finger based on a grid provided by the interpolation filter with time spacing $$\frac{T}{N_I}.$$

The fine timing correction of the strongest finger may be achieved digitally by using different filter coefficients corresponding to different phases for the sampling of the signal by the interpolation filter, each phase corresponding to a time shift multiple of $$\frac{T}{N_I N_P}.$$

Alternatively, the timing adjustment may be made to the received signal before it reaches the interpolation filter.

BRIEF DESCRIPTION OF THE DRAWINGS

For a better understanding of the present invention and to show how the same may be put into effect, reference will now be made, by way of example, to the following drawings in which.

DETAILED DESCRIPTION

Those skilled in the art to which this application relates will appreciate that other and further additions, deletions, substitutions and modifications may be made to the described embodiments.

Figure 2:
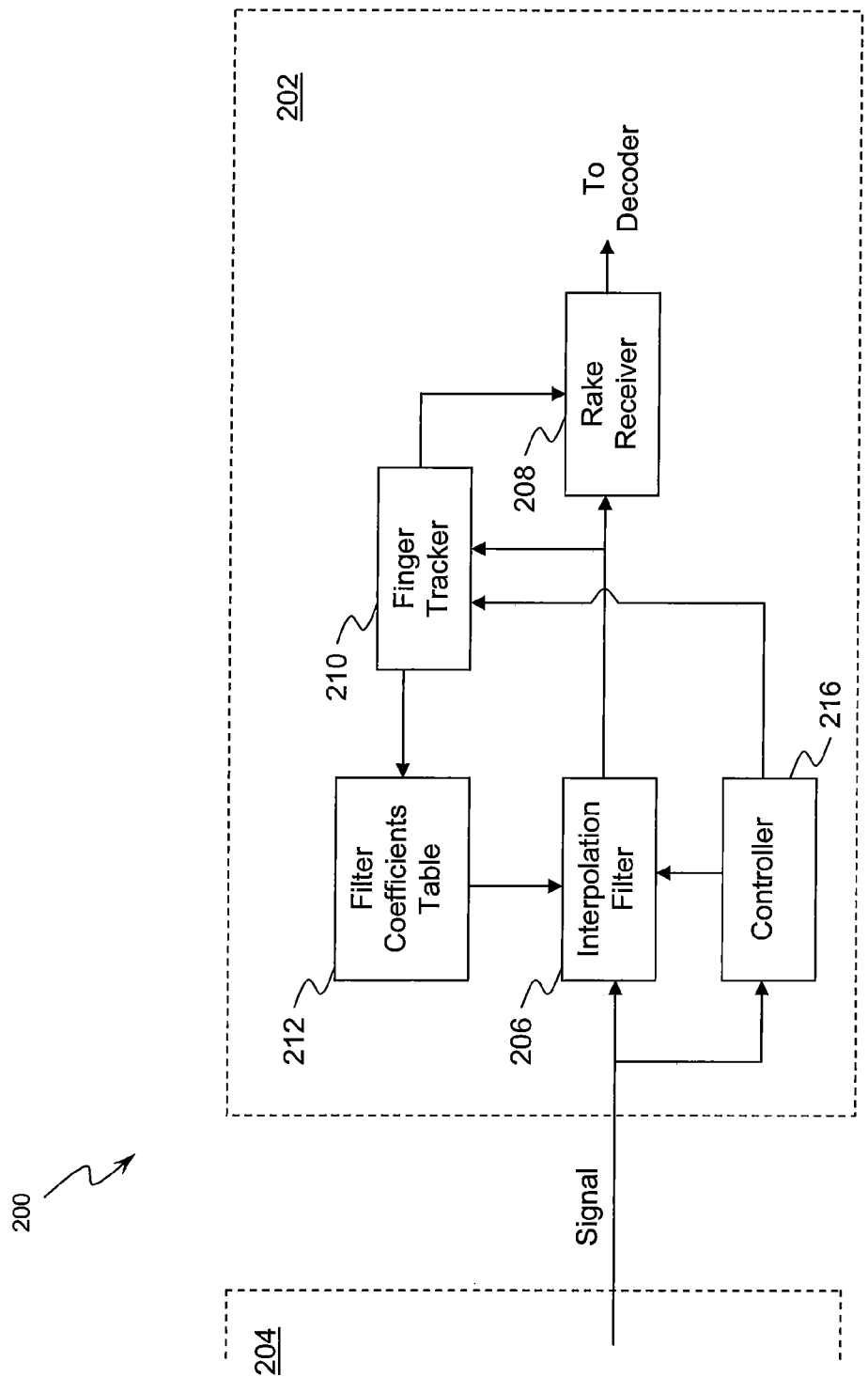
FIG. 2 is a schematic diagram of a system according to a preferred embodiment.

With reference to FIG. 2 there is now described a receiver according to a preferred embodiment. The system 200 comprises a baseband chip 202 and a Radio Frequency (RF) chip 204. The baseband chip 202 comprises an interpolation filter 206, a rake receiver 208, a finger tracker block 210, a filter coefficient table block 212 and a controller 216. An output of the radio frequency chip 204 is connected to a first input of the interpolation filter 206. An output of the interpolation filter 206 is connected to a first input of the rake receiver 208 and also connected to an input of the finger tracker block 210. A first output of the finger tracker block 210 is connected to a second input of the rake receiver 208. A second output of the finger tracker block 210 is connected to an input of the filter coefficients table block 212. An output of the filter coefficients table block 212 is connected to a second input of the interpolation filter 206. An output of the rake receiver block 208 passes to a decoder. The output of the RF chip 204 is connected to an input of the controller 216. An output of the controller 216 is connected to a third input of the interpolation filter 206.

Figure 1B:
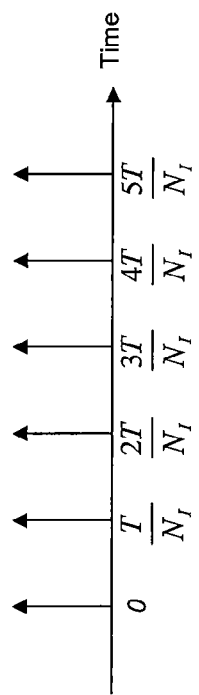
FIG. 1b is a representation of the timing of samples generated by the interpolation filter.
Figure 1A:
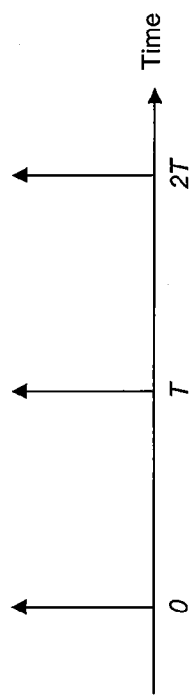
FIG. 1a is a representation of the timing of incoming signal samples.

The components shown in FIG. 1 are implemented in software in the embodiment herein described, but the components could alternatively be implemented in hardware or firmware. The baseband chip 202 of the embodiment operates in the digital domain. The output of the RF chip 204 is passed through an analog to digital converter (not shown) before reaching the interpolation filter 206 and the controller 216.

Figure 3:
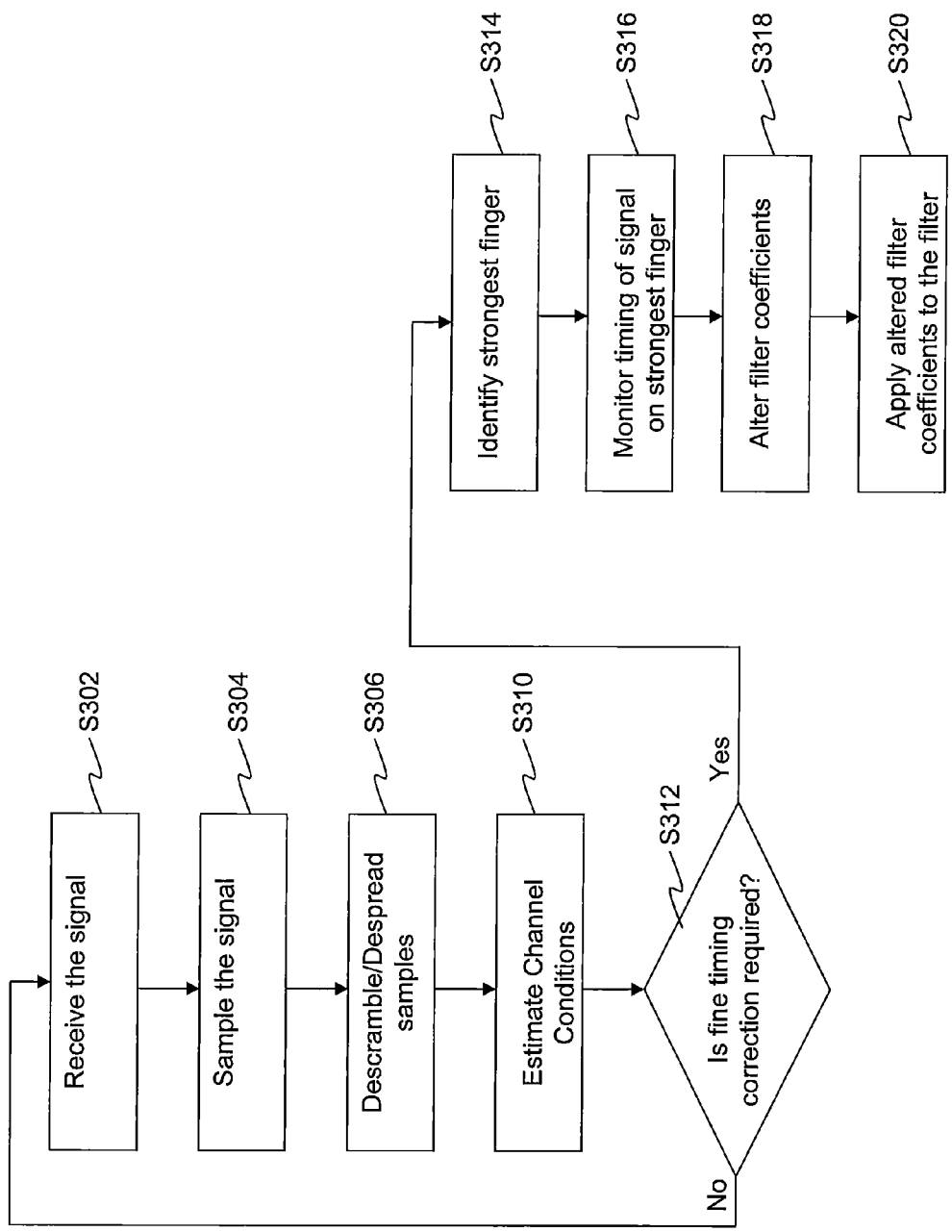
FIG. 3 is a flow chart of a process of processing a signal according to an embodiment.

In operation and with reference to FIG. 3, in step S302 a signal is received wirelessly at the system 200 using a receiver (not shown in FIG. 2). The signal is received over a channel which has at least one path. The received signal is passed to the RF chip 204. The chip rate of the signal is larger than the symbol rate, such that one symbol in the signal is represented by multiple chips.

As described above, the signal is typically sampled at a sampling rate 1/T which is approximately twice the bandwidth of the signal. The sampled signal is passed to the interpolation filter 206 from the RF chip 204. The interpolation filter 206 has an oversampling factor $N_I$, such that in step S304 the interpolation filter samples the signal with a sampling rate of $$\frac{N_I}{T}.$$

In step S306 the samples output from the interpolation filter 206 are input to the rake receiver block 208 which performs maximum ratio combining of the received signal as is known in the art. The path delays can be matched with a precision of $$\pm \frac{T}{2N_I}$$

due to the sampling rate of the interpolation filter 206.

In step S310 the channel conditions are estimated and in step S312 the estimated channel conditions are used to determine whether timing errors of less than $$\pm \frac{T}{2N_I}$$

will significantly degrade the quality of the signal when it is decoded. These steps are described below in greater detail. If timing errors of less than $$\pm \frac{T}{2N_I}$$

will significantly degrade the quality of the signal then in step S312 it is determined that fine timing correction is required and the method passes to step S314. However, if in step S312 it is determined that fine timing correction is not required then there is no need to perform fine timing correction and so steps S314 to S320 are not performed to save unnecessary usage of processing resources. The method continues with step S302 such that more of the signal is received and sampled with the current timing precision provided by the interpolation filter 206 of $$\pm \frac{T}{2N_I}.$$

The output of the interpolation filter 206 passes into an input of the finger tracker block 210. Where in step S312 it is determined that further timing correction is required, in step S314 the finger tracker block 210 identifies the strongest finger, i.e. the path of the signal which has the greatest received power. In step S316, the finger tracker block 210 uses the samples from the interpolation filter 206 having a time spacing of $$\frac{T}{N_I}$$

to track (i.e., monitor) the channel path delays, for example by using an early-late tracking algorithm. In this way, the extent to which the samples output from the interpolation filter 206 are aligned with the timing of the signal can be determined. An error in the matching between the samples output from the interpolation filter 206 and the timing of the signal leads to inter-symbol interference when the samples are descrambled and despread in the rake receiver block 208. Such inter-symbol interference will deteriorate the quality of the decoded signal. The timing of the received signal (i.e., the time between transmission and receipt of the signal) is not known exactly at the receiver. The timing of the signal will depend upon the channel. It can be important to match the timing of the channel paths to the timing of the signal to reduce the inter-symbol interference in the decoded signal. As illustrated in the examples shown in Table 1, the degradation of the signal to interference ratio is more severe for higher timing errors.

TABLE 1

Signal to Interference Ratio for different timing errors ($T_c$: chip period) in AWGN channel conditions.

| Timing Error | $\frac{T_c}{64}$ | $\frac{T_c}{32}$ | $\frac{T_c}{16}$ |
|---|---|---|---|
| Signal to Interference Ratio (dB) | 32.5 | 26.5 | 20.4 |

Table 1 shows results for a channel in which the timing error is a limiting factor for the signal to noise ratio of the decoded signal. In such channel conditions, reducing the timing error increases the signal to noise ratio. However, for channels in which the timing error is not a limiting factor for the signal to noise ratio of the decoded signal, the signal to noise ratio is limited by another factor (such as the dispersion of a multi-path channel) and so reducing the timing error does not increase the signal to noise ratio of the decoded signal.

The inventors have realized that the consequence of timing error is particularly noticeable with the highest user categories that were introduced in the 3GPP Release 7 for the support of 64-QAM constellation and the MIMO (Multiple-Input-Multiple-Output) mode. In order to achieve high throughput rates, these features use higher order modulation than that used in most other features that have been used previously. This specific system has sixteen orthogonal code sequences in the signal which makes it particularly sensitive to timing errors. Reducing the timing errors to an acceptable level in this specific system by increasing the oversampling factor alone may cause a problem in terms of complexity.

Although increasing the oversampling factor reduces timing errors, it does not always improve the performance of the system. As described above in relation to Table 1, reducing timing errors improves the performance of the system when the timing errors are the limiting factor for the performance of the system. However, when other factors are limiting the performance of the system reducing timing errors might not improve the performance of the system. Indeed, higher timing precision (i.e., higher oversampling factor) improves performance (i.e., improves the quality of the decoded signal) only when the quality of the signal itself allows it. In multi-path channels, the inter-path interference generated by the channel itself may be the dominant factor, such that the need for high timing precision is reduced. The strongest channel path (strongest rake finger) generates the most interference due to timing error and hence improving the timing precision of the strongest rake finger gives the greatest performance improvement.

The single path channel when the channel has only one path is the case that shows the highest sensitivity to timing errors. In this case, the single path of the channel is treated as the strongest path. Therefore using a low complexity technique that achieves higher precision on the timing of the strongest finger (path) allows the recovery of the loss due to insufficient timing precision in both multi-path and single path channels.

Embodiments of the present invention provide a timing correction mechanism that reduces the timing errors without increasing the oversampling factor. Furthermore, the timing correction mechanism is adaptive in the sense that it is used only when it is required, thereby reducing unnecessary use of computing power.

In order to determine when the timing correction mechanism is required in step S312, the received signal is passed to the controller 216 which is shown to be on the baseband chip 202 in FIG. 2, but the controller 216 may alternatively be located somewhere other than on the baseband chip 202 in the system 200. Furthermore, FIG. 2 shows the received signal passing to the controller 216 from the RF chip 204. In other embodiments, the signal may be passed to the controller 216 from the output of the interpolation filter 206. The controller 216 estimates the channel conditions to determine whether a more precise timing correction is required than that provided by the oversampling in the interpolation filter 206, which in the best case scenario can prevent timing errors of $$\pm \frac{T}{2N_I}$$

or more, but cannot prevent timing errors of less than $$\pm \frac{T}{2N_I}.$$

For example the determination made by the controller 216 may be dependent upon the dispersion of the channel. Where there is a dispersion on the channel greater than a threshold level, reducing the timing errors will not improve the performance of the system, so a more precise timing correction is not required. As another example, the signal to noise ratio (SNR) of the signal may be used to determine whether the more precise timing correction mechanism is required. Where the SNR of the signal is below a threshold level, the noise of the channel may be limiting the performance of the system such that a more precise timing correction is not required.

The strongest rake finger is identified in step S314 as described above. A fine timing resolution is used for the timing allocation of the strongest finger such that the timing of the signal on the strongest finger is found with a fine resolution of $$\frac{T}{N_I N_P}$$

where $N_p$ is a phase number coefficient used in the interpolation filter 206 as described below and is greater than 1. This means that the timing of the signal on the strongest rake finger is found to a greater precision than is given by the samples output by the interpolation filter 206.

Relative to the fine timing resolution used for allocating the strongest finger, the coarser timing resolution of $$\frac{T}{N_I}$$

provided by the interpolation filter 206 is used for the timing allocation of the remaining rake fingers.

In this way the timing of the signal on the strongest finger is mapped to a grid with a fine resolution of $$\frac{T}{N_I N_P},$$

whilst the timing of any remaining rake fingers are mapped (with respect to the strongest rake finger) to a grid with a course resolution of $$\frac{T}{N_I}.$$

The fine timing resolution $$\frac{T}{N_I N_P}$$

can be applied to the strongest finger at relatively low cost in complexity. In the embodiment described above with reference to FIGS. 1 and 3, the fine timing resolution can be applied digitally on the baseband chip 202. This is achieved in step S318 in which a signal is sent from the finger tracker block 210 to the filter coefficient table block 212 thereby effecting a change in the filter coefficients. In particular, the phase of the interpolation filter 206 is altered in accordance with the fine timing resolution of the strongest finger as found in the finger tracker block 210. The alteration of the phase of the interpolation filter 206 is described in more detail below. In step S320 the interpolation filter 206 applies the altered filter coefficients such that the timing of the generation of the samples in the interpolation filter 206 is aligned with the timing of the signal on the strongest finger to within a timing range of $$\frac{T}{N_I N_P}.$$

Figure 4:
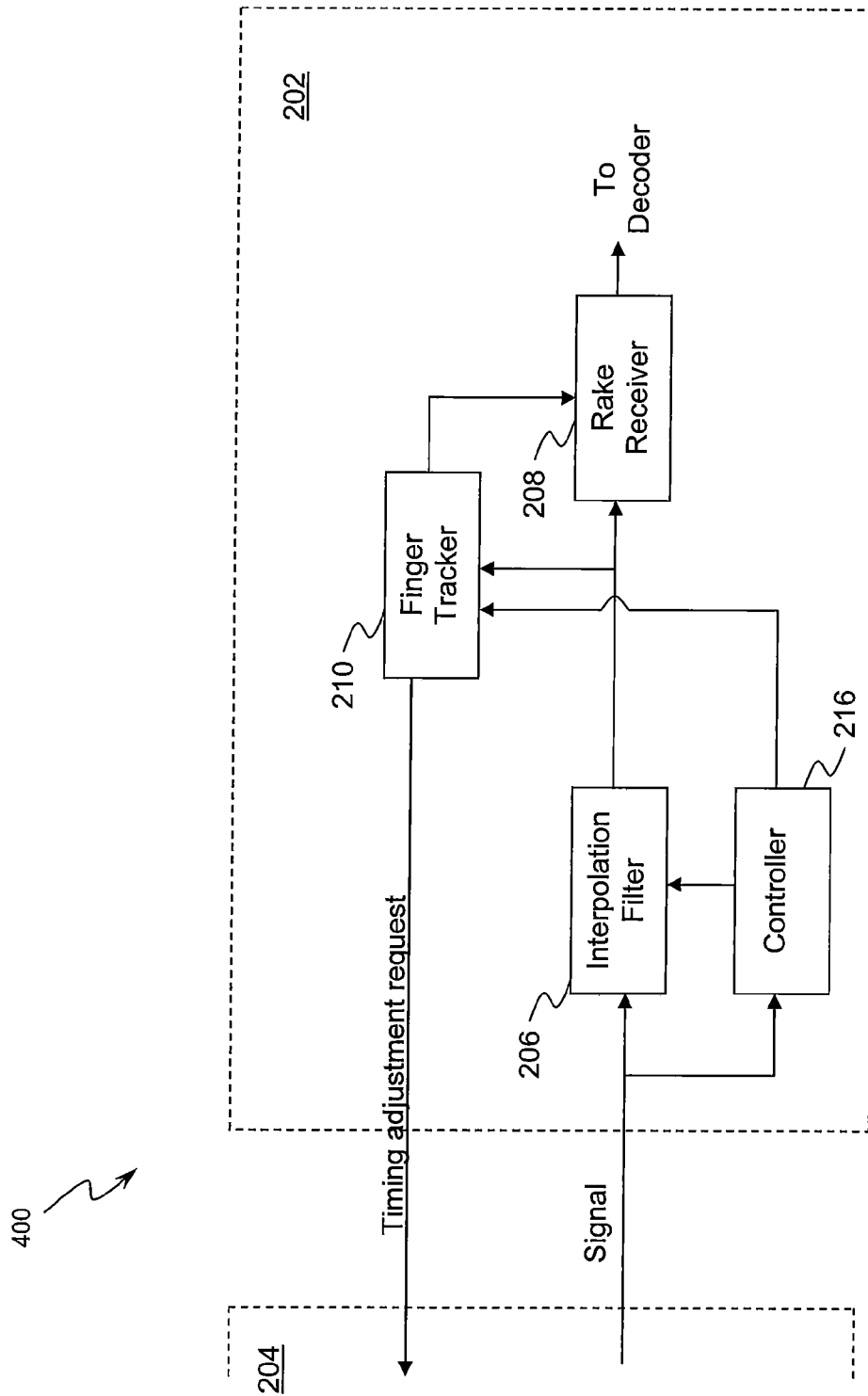
FIG. 4 is a schematic diagram of a system according to an alternative embodiment.

In an alternative embodiment, as shown in FIG. 4, rather than altering the timing of the generation of the samples in the interpolation filter 206, the timing of the signal sent to the interpolation filter 206 from the RF chip 204 may be altered such that the timing of the generation of the samples in the interpolation filter 206 is aligned with the timing of the signal on the strongest finger to within a timing range of $$\frac{T}{N_I N_P}.$$

In this alternative embodiment a signal is sent from the finger tracker block 210 to the RF chip 204 instructing the RF chip 204 to alter the timing of the signal accordingly.

We return to the embodiment shown in FIGS. 1 and 3 in which the filter coefficients are altered to effect the fine timing resolution mechanism. The interpolation filter 206 has a phase which is governed by the phase coefficient $N_p$ in the filter coefficients table block 212. The phase of the interpolation filter 206 corresponds to a time shift multiple of $$\frac{T}{N_I N_P}$$

which is used to determine when to sample the signal. For example filter phase $f_p$ (where $p=0, \ldots, N_p-1$) corresponds to a time shift $$p \frac{T}{N_I N_P}$$

with respect to phase reference $f_0$. By altering the phase of the interpolation filter 206 the time spacing between the samples generated by the interpolation filter 206 is unchanged (i.e., it remains at $$\frac{T}{N_I})$$

but the timing of each of the samples is shifted by an amount $$p \frac{T}{N_I N_P},$$

such that the timing of the sampling of the interpolation filter 206 can be adjusted with a resolution of $$\frac{T}{N_I N_P}.$$

A minimum of $N_p$ filter phases are needed to achieve a timing resolution of $$\frac{T}{N_I N_P}.$$

In this case the time shifts corresponding to the different phases form a uniform grid spanning a time interval $$\frac{T}{N_I}.$$

Figure 5:
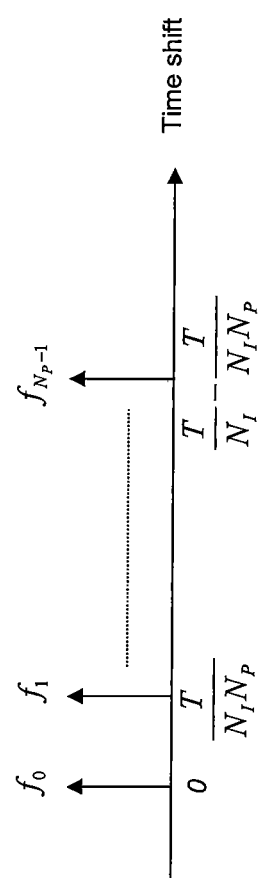
FIG. 5 is a representation of time shifts corresponding to different phase coefficients of the interpolation filter of an embodiment.

This is shown in FIG. 5 which shows the timing corresponding to the different phases ($f_0$ to $f_{N_p-1}$) of the interpolation filter 206. The phase coefficients $f_p$ of the interpolation filter can be generated by interpolating the reference interpolation filter coefficients $f_0$ at time shifts $$p \frac{T}{N_I N_P} \ (p=1, \ldots, N_p - 1).$$

The strongest rake finger is identified. In the case of a single path channel, the strongest rake finger corresponds to the one path of the single path channel. In the case of a multi-path channel, the strongest rake finger corresponds to the path with the highest received signal power. The signal on the strongest rake finger is monitored in order to determine the timing of the signal on that rake finger. The timing of the strongest finger is found to a resolution of $$\frac{T}{N_I N_P}$$

(which is a finer resolution than that provided by the interpolation filter of $$\frac{T}{N_I}).$$

The finger tracking on the strongest finger determines the phase used by the interpolation filter 206, thereby allowing the output of the interpolation filter 206 to capture the strongest finger timing with an error less than or equal to $$\pm \frac{T}{2 N_I N_P}.$$

The tracking of the remaining of the fingers has no effect on which phase of the interpolation filter 206 is used.

The tracking of the strongest finger is fine enough to allow a fine timing resolution of $$\frac{T}{N_I N_P}.$$

However, the tracking of the remaining fingers is only good enough to allow a coarse resolution of $$\frac{T}{N_I}.$$

As an example, we denote by $(p, t_m)$ a representation of the tracked timing of finger m, which corresponds to a timing estimate, $\hat{\tau}_p$, where $$\hat{\tau}_p = t_m \frac{T}{N_I} + p \frac{T}{N_I N_P} = \left(t_m + \frac{p}{N_P}\right)\frac{T}{N_I},$$

where p is the associated phase of the interpolation filter 206 and $t_m$ is the delay in number of samples at the output of the interpolation filter 206.

Only the strongest finger tracking controls the phase p. Assuming that the finger tracking decides to update the strongest finger timing $(p, t_s)$ by $$d\frac{T}{N_I N_P},$$

then the new timing corresponds to $(p', t_s')$:

$$\begin{cases} p' = (p+d) \text{MODULO} N_P \\ t_s' = t_s + (p+d-p') DIV N_P, \end{cases}$$

where MODULO denotes the modulo operation and DIV the integer division operation.

The remaining fingers should be tracked normally, ignoring the use of different phases of the interpolation filter 206. An optional modification can be added to improve tracking of the remaining fingers when the new phase coming from the strongest finger p' and the old one p are too far apart. In this case the timing of the remaining fingers can be updated in the following way:

$$\begin{cases} \text{if } \left(p - p' > \frac{N_P}{2}\right) & t_m' = t_m + 1 \\ \text{if } \left(p - p' < -\frac{N_P}{2}\right) & t_m' = t_m - 1. \end{cases}$$

Although the invention is proposed to enhance the performance of a rake receiver, it is also advantageous to use it in conjunction with a chip spaced equalizer. Indeed, in this case failure to sample the signal with the right timing can transform a flat channel with single path impulse response into frequency selective channel with multi-path response which makes equalization much more difficult. The same principle proposed here for the tracking of the strongest finger can be used in the case where an equalizer is used.

Figure 6:
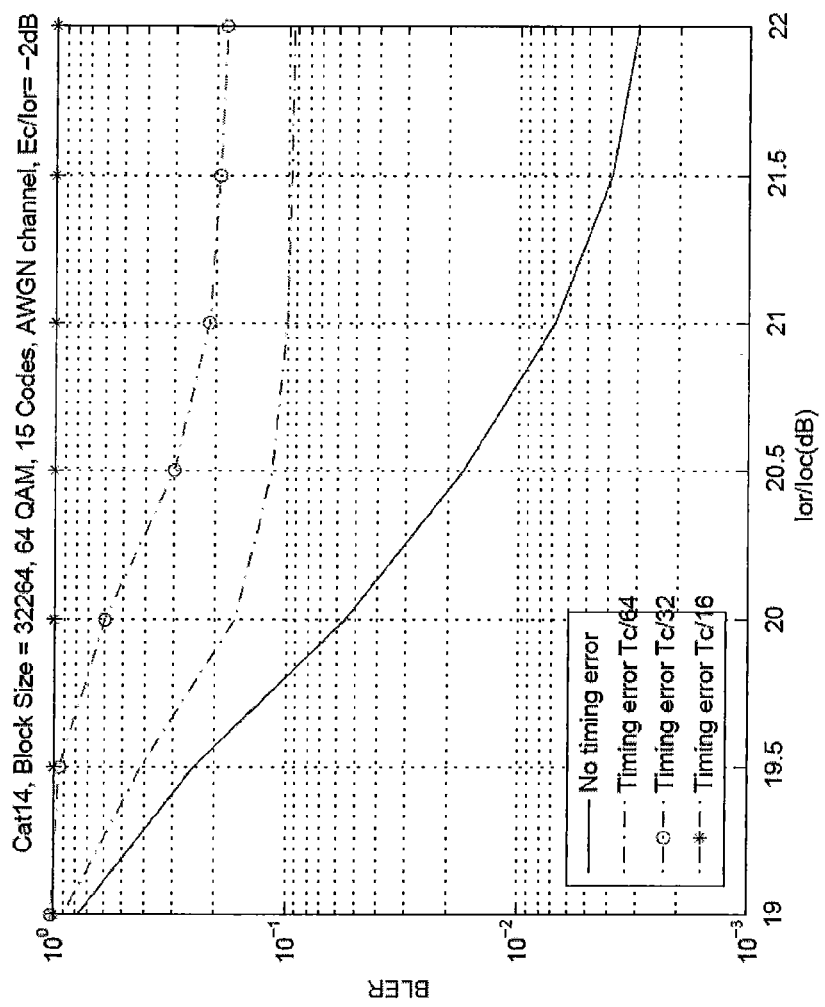
FIG. 6 is a graph showing the results of a first simulation.
Figure 7:
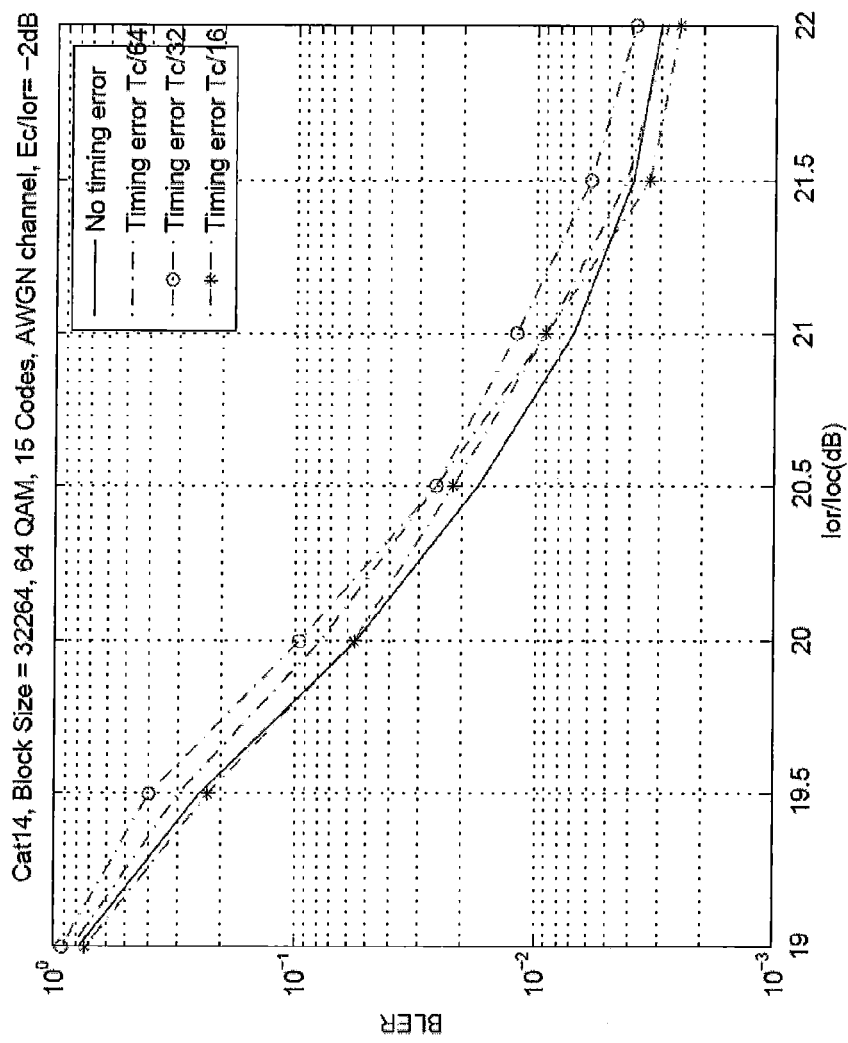
FIG. 7 is a graph showing results of a second simulation.

To evaluate the effectiveness of the solution system simulations have been carried out, and the results are shown in FIGS. 6 and 7. The simulations measure the BLock Error Rate (BLER) performance for a fixed transport block size transmitted on the High Speed Physical Downlink Shared Channel (HS-PDSCH). Simulations assume an Additive White Gaussian Noise (AWGN) channel and a Rake receiver structure. FIGS. 6 and 7 show the performance for Category 14 transport block size 32264 with 64-QAM modulation [3GPP TS 25.321, "Technical Specification Group Radio Access Network; Medium Access Control (MAC) protocol specification", September 2008, Annex A]. In FIGS. 6 and 7 performance is shown in terms of BLER versus Geometry. The Geometry is the ratio of the useful received signal power to the noise plus inter-cell interference power. An interpolation filter with oversampling factor $N_1=8$ is used in the two cases. FIG. 6 relies on only the interpolation filter for timing, so the phase of the interpolation filter is not altered as described above, and so the timing of the samples taken by the interpolation filter are accurate only to within $$\pm \frac{T}{2N_I}.$$

FIG. 7 shows the performance when the proposed multi-phase interpolation filter approach is used with an eight possible phases for the interpolation filter (i.e., $N_P=8$).

Results are shown for different values of timing error introduced between the transmitter and the receiver. Timing errors of 0, $$\frac{T_c}{64}, \frac{T_c}{32} \text{ and } \frac{T_c}{16}$$

are shown in FIGS. 6 and 7. The timing errors that are introduced $$\left(\frac{T_c}{64}, \frac{T_c}{32} \text{ and } \frac{T_c}{16}\right)$$

are all less than or equal to $$\frac{T_c}{2N_I},$$

therefore they cannot be corrected by the interpolation filter which takes samples approximately every $$\frac{T_c}{N_I},$$

so can only correct for timing errors of at least $$\pm \frac{T_c}{2N_I}.$$

FIG. 6 shows the impact of the introduced timing error. It can be seen that the increasing timing errors have a dramatic effect on performance and lead to an error floor even in the case of infinite geometry (no noise).

FIG. 7 on the other hand shows that using the proposed approach for increasing timing resolution allows the recovery of all the loss due to timing errors. This is possible because the increased timing resolution allows for the correction of timing errors of at least $$\pm \frac{T_c}{2N_I N_P},$$

which in the example shown in FIG. 7 (for $N_I=8$ and $N_p=8$) is $$\pm \frac{T_c}{128}.$$

There has been described a method and system for determining whether timing errors caused by the finite sampling period of the interpolation filter 206 are a significant factor in reducing the quality of the signal. If these timing errors (of the order of $$\pm \frac{T_c}{2N_I})$$

are not limiting the quality of the signal (i.e., if other factors are limiting the quality of the signal), then it is not necessary to reduce the timing errors further. In that case the fine timing of the signal as described above to find a phase coefficient to apply to the interpolation filter is advantageously not performed.

However, when the timing errors of the interpolation filter are limiting the quality of the signal then the method described above is implemented to determine fine timing resolution by aligning the sampling of the interpolation filter to the timing of the signal to an accuracy of within $$\pm \frac{T_c}{2N_I N_P}.$$

This will improve performance and the quality of the signal that is decoded in the system. This is especially valid in the case of a single path channel, where small timing errors can lead to substantial inter-symbol interference.

Since the sampling rate of the interpolation filter 206 is not increased, there is no additional cost in terms of complexity and no impact on the architecture of existing systems.

By setting the number of different phases used in the interpolation filter, the precision of the timing correction can be set accordingly. The present invention is particularly attractive for embodiments in which reprogrammable interpolation filter coefficients are used, such that the phase coefficient for the interpolation filter 206 can be altered in accordance with the current channel conditions to thereby set the precision of the timing correction dynamically. The present invention is particularly useful where the interpolation filter 206 is implemented as a software block, although it would be possible to implement the interpolation filter as a hardware block.

The baseband chip 202 preferably operates in the digital domain. However, it is possible in other, less preferred embodiments for the baseband chip 202 to operate in the analog domain.

While this invention has been particularly shown and described with reference to preferred embodiments, it will be understood to those skilled in the art that various changes in form and detail may be made without departing from the scope of the invention as defined by the appendant claims.

What is claimed is:

1. A method of processing a signal in a wireless communication system, the signal comprising a sequence of chips, the method comprising:
   receiving the signal at a set of rake fingers via a channel;
   identifying one of said set of rake fingers receiving a greatest signal power;
   sampling the received signal to generate samples of the signal, wherein there is a time spacing of integer $t_1$ between successive samples which is less than a time spacing of integer $t_c$ between successive chips in the signal;
   estimating channel conditions on the channel; and
   based on the estimated channel conditions, selectively performing the steps of:
   monitoring a timing of the signal on said identified rake finger to determine a time difference between the timing of the signal on said identified rake finger and the timing of the generation of the samples with spacing $t_1$, the determined time difference being a multiple of an integer $t_2$, where $t_2$ is less than $t_1$; and
   using the determined time difference to align the timing of the generation of the samples with the timing of the signal on said identified rake finger to within a timing range of integer $t_2$.

2. The method of claim 1 comprising: determining, based on the estimated channel conditions, whether timing errors of $t_1$ are a limiting factor to the quality of the received signal, wherein the steps of monitoring the timing of the signal and of using the determined time difference are performed only if it is determined that timing errors of $t_1$ are a limiting factor to the quality of the received signal.

3. The method of claim 1 wherein the step of estimating channel conditions comprises estimating the dispersion of the signal, wherein the steps of monitoring the timing of the signal and of using the determined time difference are performed only if the estimated dispersion is below a threshold level.

4. The method of claim 1 wherein the step of estimating channel conditions comprises estimating the signal to noise ratio of the signal, wherein the steps of monitoring the timing of the signal and of using the determined time difference are performed only if the estimated signal to noise ratio is above a threshold level.

5. The method of claim 1 wherein an interpolation filter is used in the step of sampling the received signal to generate the samples of the signal and wherein the step of using the determined time difference comprises altering a phase coefficient of the filter to thereby alter the timing of the generation of the samples in discrete steps of magnitude $t_2$.

6. The method of claim 1 wherein an interpolation filter is used in the step of sampling the received signal to generate the samples of the signal and wherein the step of using the determined time difference comprises altering the timing of inputting the received signal to the interpolation filter in discrete steps of magnitude $t_2$.

7. A receiver for processing a signal in a wireless communication system, the signal comprising a sequence of chips, the receiver comprising:
   a set of rake fingers for receiving the signal via a channel;
   an interpolation filter configured to sample the received signal to generate samples of the signal, there being a time spacing of integer $t_1$ between successive samples which is less than a time spacing of integer $t_c$ between successive chips in the signal;

a processor; and a non-transient computer readable medium containing program instructions for causing said processor to:

identify one of said set of rake fingers receiving a greatest signal power;

monitor a timing of the signal on one of the at least one rake finger to determine a time difference between the timing of the signal on said identified rake finger and the timing of the generation of the samples with spacing $t_1$, the determined time difference being a multiple of an integer $t_2$, where $t_2$ is less than $t_1$;

use the determined time difference to align the timing of the generation of the samples with the timing of the signal on said identified rake finger to within a timing range of integer $t_2$;

estimate channel conditions on the channel; and determine, based on the estimated channel conditions, whether the timing of the generation of the samples is to be aligned with the timing of the signal on said identified rake finger to within said timing range of integer $t_2$.

8. The receiver of claim 7 wherein the receiver further comprises a filter coefficient table comprising a phase coefficient for the interpolation filter and uses the determined time difference comprising means for altering the phase coefficient to thereby alter the timing of the generation of the samples at the interpolation filter in discrete steps of magnitude $t_2$.

9. A method of processing a signal in a wireless communication system, the signal comprising a sequence of chips, the method comprising:

identifying one of a set of rake fingers receiving a greatest signal power;

receiving the signal at the identified rake finger;

sampling the received signal to generate samples of the signal, wherein there is a time spacing of integer $t_1$ between successive samples which is less than a time spacing of integer $t_c$ between successive chips in the signal;

estimating channel conditions on the channel; and based on the estimated channel conditions, adaptively switching in fine resolution timing correction method steps comprising:

monitoring a timing of the signal on the identified rake finger to determine the timing of the signal on the identified rake finger to an accuracy of $$\pm \frac{t_2}{2},$$

where $t_2$ is an integer less than $t_1$; and aligning the timing of the generation of the samples with the timing of the signal on the identified rake finger to within a timing range integer $t_2$.

* * * * *